April 26, 1927.  
G. A. LYON  
1,626,347  
AUTOMOBILE BUFFER AND ATTACHMENT THEREFOR  
Filed May 10, 1923
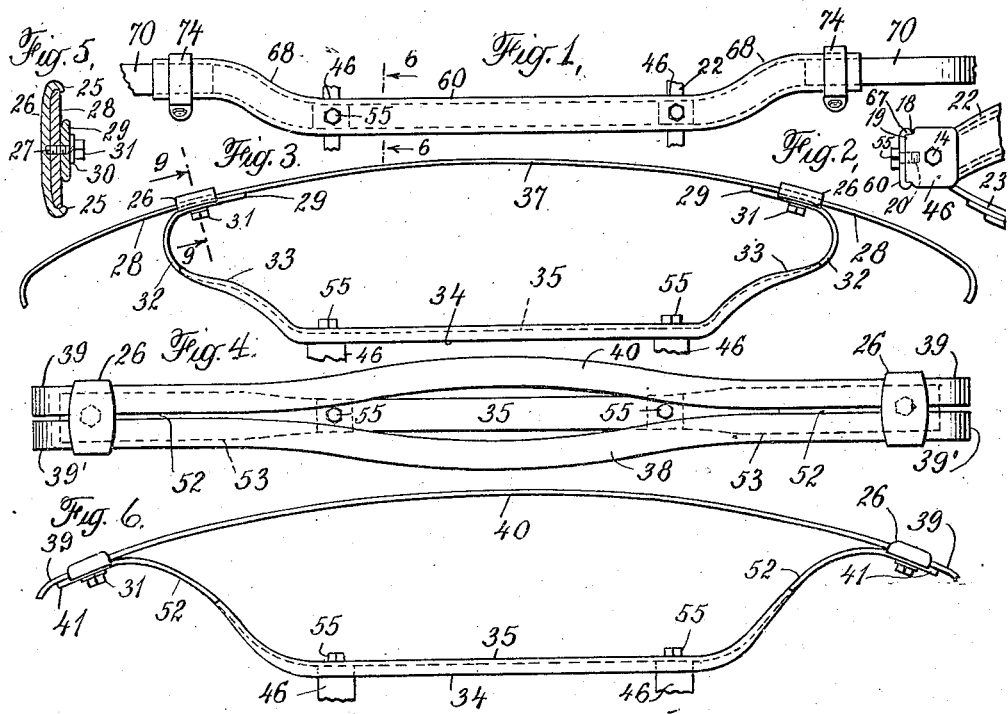
INVENTOR  
George Albert Lyon  
ATTORNEY.  
Harry L. Duncan Patented Apr. 26, 1927.

1,626,347

UNITED STATES PATENT OFFICE.

GEORGE ALBERT LYON, OF PHILADELPHIA, PENNSYLVANIA.

AUTOMOBILE BUFFER AND ATTACHMENT THEREFOR.

Application filed May 10, 1923. Serial No. 637,934.

This invention relates especially to automobile buffers with which may be combined brace bar or transverse supporting members or buffer portions which may be secured or connected to the two frame members of the automobile or other vehicle to reenforce and strengthen them and also support the buffer therefrom. For this purpose special frame ends which may be riveted or otherwise connected to the forward ends or portions of the usual channel section frame members of the vehicle may advantageously be provided with heads or supporting portions which may have a substantially vertical contact face, if desired, and also one or more cooperating aligning portions to be engaged by ribs or flanges on the cooperating buffer member or brace bar portion. This transverse buffer supporting member or brace bar portion may advantageously be of spring channel construction and may be bolted or otherwise secured to each of the supporting heads or frame ends as by having one or more bolts pass through the brace bar member so as to engage the frame end in a horizontal or vertical direction and thus tightly bolt or clamp the buffer member thereto. This makes a strong and neat method of attaching the buffer to the automobile and simultaneously gives a strong and reliable reenforcing connection between the front ends of the frame members which is quite desirable in many cases. This form of attachment is particularly desirable for buffers which are installed as part of the regular automobile equipment and attached to the automobiles before they are sent out from the factory where these special supporting frame ends may be installed. This transverse supporting or brace bar portion of the buffer may, if desired, have its ends bent upward in some cases beyond the frame end connections so that these end connecting portions may be arranged, if desired, several inches above the frame ends so as to correspondingly raise the connected buffer elements which may be of any suitable construction; although if the brace bar connector ends are horizontally in line with the frame ends to which they are secured, the buffer is somewhat more strongly supported under collision conditions. A Lyon type buffer front of the character covered by the Lyon Patent 1,247,300 of November 20, 1917, is desirable in this connection and may comprise several reenforcing or overlapping spring strips or buffer front members permanently or adjustably connected together so as to overlap or reenforce each other at least throughout the central buffer front and have free ends of the front strips extending to and ending at the lateral ends of the buffer in front of the automobile wheels, and preferably having connecting portions which may be adjustably clamped or connected to the end connector portions of the brace bar member, if desired. In some cases, however, a spring channel front member or vertically wide front plate of flanged or channeled construction may be used in the buffer front and may be connected to separate spring strip end loop portions supported in any desired way from the frame ends so as preferably to connect them together and have a laterally bracing action thereon.

In the accompanying drawing showing in a somewhat diagrammatic way various illustrative embodiments of this invention:

Fig. 1 is a partial front view of a buffer supporting member.

Fig. 2 is a side view showing the connection therefor taken substantially along the line 6—6 of Fig. 1.

Fig. 3 is a top view showing another illustrative buffer.

Fig. 4 is a front view of another construction.

Fig. 5 is an enlarged transverse section along the line 9—9 of Fig. 3, showing the clamping device, and Fig. 6 is a top view of Fig. 4.

In the illustrative arrangement shown in Fig. 1 the rear transverse supporting member or brace bar portion 60 may be formed of channeled section spring steel of such size as to substantially fit the vertical contact face 19 of the supporting frame end or head 46 shown in Fig. 2. The stiffening flanges 67 on this member are preferably arranged to extend rearwardly so that at least one of these flanges engages one of the aligning edges or faces 18 of the heads to which the member may be clamped or bolted in any suitable way. For this purpose the head may be provided with one or more threaded apertures 20 to accommodate the threaded ends of bolts such as 55 which may pass through suitable holes or slots in the transverse spring channel or other supporting member so that they hold this member securely in position against the contact faces of the two cooperating heads which may, of course, have integral rearwardly extending supporting portions within the channeled frame members 22 to which they may be welded, bolted or riveted to form a rigid built in head or supporting frame end. As shown in Fig. 1, the ends of this rear supporting member or brace bar portion 60 may be vertically displaced or raised at 68 so as to form raised and preferably substantially horizontal connector portions extending laterally outside of the frame members and two to four inches above the central portion of this transverse member, if desired, and adapted to be clamped or connected to the cooperating buffer elements. Any suitable buffer front may be used for this purpose, examples thereof being shown in Patents No. 1,467,382, and No. 1,467,390, issued September 11, 1923, to G. A. Lyon. Inturned connector portions 70 of the buffer front strips preferably fit fairly snugly within the rearwardly extending flanges 67 of the supporting member so that they may be clamped or connected thereto as by the enclosing clamping devices 74.

In the illustrative buffer shown in Fig. 3 a rear supporting or brace bar portion 35 of spring channeled construction may be used and may be similarly attached or bolted to the built in ends 46 on the frame ends. This spring channel may be specially formed, if desired, and its rearwardly extending flanges 34 may gradually die out and become of less height in the forwardly and outwardly curved portions 33 so that at about the point 32 a single flat sectioned strip of greater resilience is available for supporting the buffer front and for connection thereto. If desired, inturned connector ends 29 may be formed on this supporting member so as to be clamped or connected to the buffer front of any suitable type. If desired, one or more straight or forwardly curved connected front strips or other suitable members such as the wide plate or strip 37 may be used and may be of steel strip four or five inches wide in some cases and formed with suitable slots or holes at the connecting portions 28 which may be clamped or connected to the inturned connector portion 29 of the supporting member. If desired, a clamping device 26, shown more in detail in Fig. 5, may be used for this purpose and may comprise the rearwardly projecting or gripping edges 25 to more or less grip or engage the part 28 of the front strip or member to which the supporting connector end 29 may be securely fastened as by the clamping bolt 31 engaging the threaded hole 27 in the clamping member 26 and held in tightened position as by the lock washer 30. This buffer front member may, if desired, have projecting free strip ends extending considerably beyond these clamping members so as to extend out in front of the automobile wheels and thus protect all parts of the machine.

If desired, a multiple strip buffer front may be used in this connection and may comprise several adjustably connected front strips overlapping or reenforcing each other at least throughout the central portion of the buffer front and having free ends which may project out to and end at the lateral ends of the buffer so as to extend, if desired, in rearwardly inclined position in front of or adjacent the automobile wheels. The buffer front, as shown in Fig. 4, may comprise two vertically separated strips 39, 39′ of tempered spring steel or other suitable material which may be similarly clamped or bolted to buffer supporting members as by similar clamping devices 26. In some cases also it is of advantage to secure a still further vertical separation between the strips as by oppositely bending them throughout the portions 38, 40 so as to form a vertically widened central portion of the buffer front. Such a buffer front may, of course, be used on the supporting member shown in Fig. 3 or it may be clamped or bolted to the supporting member shown in Fig. 6 which may comprise a spring channel rear supporting member 35 similarly bolted or secured to the built in frame ends 46. This spring channel may, with advantage, have its flanges 34 opened out or flattened gradually throughout the curved portions 52 beyond the frame ends so that, as seen in Fig. 4, the edges 53 of this part of the supporting member diverge so as to be considerably wider apart so as to form a resilient and wide connector end 41 at each end of the resilient supporting member which may, if desired, extend out to or adjacent the projecting ends of the buffer front strips such as 39. Any desired form of clamping device may be used to connect these parts, such as the clamping members 26 shown in Fig. 5 and previously described in detail.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims.

I claim:

1. The automobile buffer comprising a rear buffer supporting member of channel sectioned spring steel strip having a rearwardly extending flanged portion adapted to extend between the frame ends of the automobile and having outwardly and forwardly projecting flattened and widened ends to form forwardly and outwardly curving resilient portions and vertically wide inturned end connector portions to rearwardly engage and support a buffer front, and a forwardly arched vertically wide multiple strip buffer front clamped to said connector portions and having a multiple strip reenforced vertically wide central portion and outwardly extending rearwardly inclined free strip ends extending to and ending at the lateral ends of the buffer and adapted to extend into protective position adjacent the automobile wheels.

2. The automobile buffer comprising a rear buffer supporting member of channel sectioned steel strip having a rearwardly extending flanged portion adapted to extend between the frame ends of the automobile and having outwardly and forwardly projecting flattened and widened ends to form forwardly and outwardly curving vertically wide inturned end connector portions to support a buffer front, and a multiple strip buffer front clamped to said connector portions and having a multiple strip reenforced vertically wide central portion and outwardly projecting rearwardly inclined free strip ends extending to and ending at the lateral ends of the buffer and adapted to extend into protective position adjacent the automobile wheels.

3. The automobile buffer comprising a rear buffer supporting member of angular sectioned steel strip having a rearwardly extending flanged portion adapted to extend between the frame ends of the automobile and having outwardly and forwardly projecting flattened and widened inturned end connector portions to support a buffer front and a multiple strip buffer front adjustably clamped to said connector portions and having a reenforced vertically wide central portion of the buffer front and outwardly projecting rearwardly inclined free strip ends extending to and ending at the lateral ends of the buffer and adapted to extend into protective position adjacent the automobile wheels.

4. The automobile buffer comprising a rear buffer supporting member of angular sectioned steel strip having a portion adapted to extend between the frame ends of the automobile and having outwardly and forwardly projecting flattened and widened inturned end connector portions to support a buffer front, and a multiple strip buffer front clamped to said connector portions and having a central buffer front portion and outwardly projecting free strip ends extending to and ending at the lateral ends of the buffer and adapted to extend into protective position adjacent the automobile wheels.

5. The automobile buffer comprising a rear buffer supporting member of spring steel adapted to extend between the frame ends of the automobile and having outwardly and forwardly projecting vertically wide inturned end connector portions to rearwardly engage and support a buffer front, and a multiple, steel strip buffer front secured to said connector portions and having outwardly projecting free strip ends extending substantially to and ending substantially at the lateral ends of the buffer.

6. The automobile buffer comprising a rear buffer supporting member adapted to extend between the frame ends of the automobile and having outwardly and forwardly projecting connector portions to support a buffer front, and a steel strip buffer front secured to said connector portions and having outwardly projecting free strip ends extending substantially to the lateral ends of the buffer.

7. The automobile buffer comprising a rearwardly extending buffer supporting member adapted to be connected to the frame of the automobile and having inturned end connector portions to rearwardly engage and support a buffer front and a steel strip buffer front adjustably secured to said connector portions and having a vertically wide central portion and outwardly projecting rearwardly inclined free strip ends extending substantially to and ending substantially at the lateral ends of the buffer.

8. The automobile buffer comprising a rear laterally extending buffer supporting member adapted to be connected to the frame of the automobile and having inturned end connector portions to support a buffer front, and a steel strip buffer front secured to said connector portions and having outwardly projecting free strip ends extending substantially to and ending substantially at the lateral ends of the buffer.

9. The automobile buffer comprising a rear laterally extending buffer supporting member adapted to be connected to the frame of the automobile and having connector portions to support a buffer front, and a multiple steel strip buffer front secured to said connector portions and having a reenforced vertically wide central portion and outwardly and rearwardly projecting free strip ends extending to and ending at the lateral ends of the buffer front and adapted to extend into protective position adjacent the automobile wheels.

10. The automobile buffer comprising a rear laterally extending buffer supporting member adapted to be connected to the frame of the automobile and having connector portions to support a buffer front, and a steel strip buffer front secured to said connector portions and having outwardly projecting free strip ends extending to and ending at the lateral ends of the buffer front and adapted to extend into protective position adjacent the automobile wheels.

11. The automobile buffer comprising a rear buffer supporting member of channel sectioned spring steel having a rearwardly extending flanged portion adapted to extend between the frame ends of the automobile and having outwardly projecting flattened and widened ends to form forwardly and outwardly curving resilient portions and vertically wide inturned connector end portions to rearwardly engage and support a buffer front, and a forwardly arched vertically wide steel strip buffer front clamped to said connector end portions.

12. The automobile buffer comprising a rear buffer supporting member of channel sectioned spring steel having a rearwardly extending flanged portion adapted to extend between the frame ends of the automobile and having outwardly projecting flattened and widened connector end portions to rearwardly engage and support a buffer front, and a vertically wide steel strip buffer front clamped to said connector end portions.

13. The automobile buffer comprising a rear buffer supporting member of angular sectioned tempered spring steel having a rearwardly extending flanged portion adapted to extend between the frame ends of the automobile and having outwardly projecting flattened and widened ends to form forwardly curving resilient portions and vertically wide connector end portions adapted to support a buffer front and a vertically wide multiple strip buffer front adjustably clamped to said connector end portions.

14. The automobile buffer supporting member of angular sectioned steel having a flanged portion adapted to extend between the frame ends of the automobile and having outwardly projecting flattened and widened ends to form vertically wide connector end portions adapted to support a buffer front.

15. The automobile buffer supporting member of channel sectioned spring steel strip having a rearwardly extending flanged portion adapted to extend between and be connected to the frame members of the automobile and having outwardly projecting flattened and widened ends forming forwardly and outwardly curving resilient portions and vertically wide inturned connector end portions adapted to rearwardly engage and support vertically wide buffer front members.

16. The automobile buffer supporting member of channel sectioned strip having a rearwardly extending flanged portion adapted to be connected to the frame members of the automobile and having outwardly projecting widened ends forming vertically wide connector portions adapted to rearwardly engage and support buffer front members.

17. The automobile buffer supporting member having a rearwardly extending rectangular sectioned portion adapted to extend between and be connected to the frame members of the automobile and having outwardly projecting flattened and widened curved resilient ends forming vertically wide inturned connector portions adapted to rearwardly engage and support a vertically wide buffer front.

18. The automobile buffer supporting member having a rearwardly extending angular sectioned portion adapted to extend between and be connected to the frame members of the automobile and having outwardly projecting widened ends forming vertically wide connector portions adapted to rearwardly engage and support a vertically wide buffer front.

19. The automobile buffer comprising a laterally extending rear supporting member of channel sectioned tempered spring steel adapted to aligningly cooperate with and be bolted to built in frame ends and having diverging flattened widened portions beyond said frame ends to form forwardly and outwardly extending curved supporting members and inturned connector portions adapted to be connected to buffer front members.

20. The automobile buffer comprising a laterally extending rear supporting member of channel sectioned tempered spring steel adapted to cooperate with and be bolted to built in frame ends and having diverging widened portions beyond said frame ends to form forwardly and outwardly extending supporting members and connector portions adapted to be connected to buffer front members.

GEORGE ALBERT LYON.